Oct. 25, 1960

J. S. GROSSO ET AL 2,957,385

OPTICAL CRYSTAL ALIGNMENT

Filed Sept. 11, 1956

INVENTORS
JOHN S. GROSSO
HORST A. R. WEGENER
BY
Eyre, Mann & Burrows
ATTORNEYS

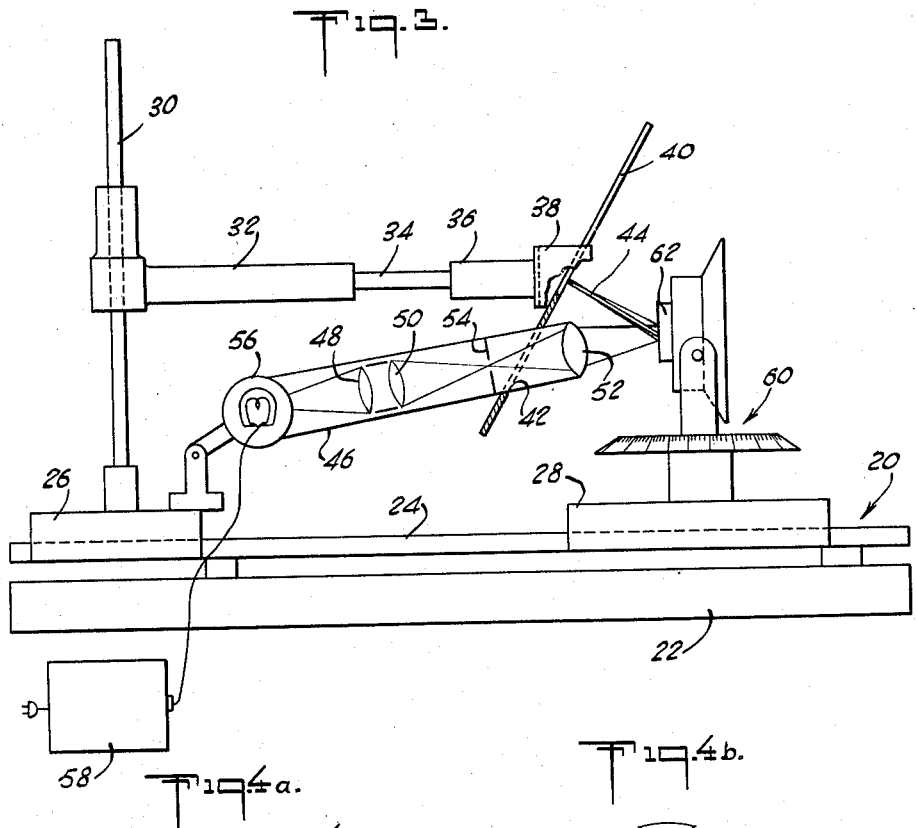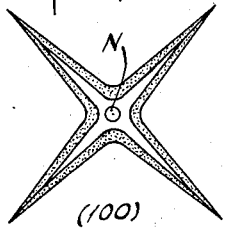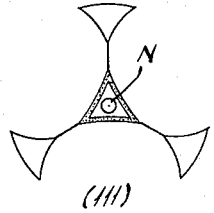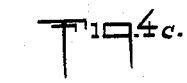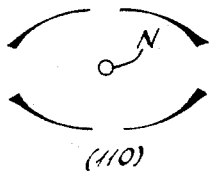

United States Patent Office 2,957,385
Patented Oct. 25, 1960

2,957,385

OPTICAL CRYSTAL ALIGNMENT

John S. Grosso, Union, and Horst A. R. Wegener, Lincoln Park, N.J., assignors to Tung-Sol Electric Inc., a corporation of Delaware Filed Sept. 11, 1956, Ser. No. 609,256

1 Claim. (Cl. 88—14)

The present invention relates to orientation of crystals and comprises a simple optical instrument adapted to give rapid crystal orientation and suitable for use in production of crystal devices, such as crystal diodes, transistors and the like. The new instrument utilizes reflection of convergent light from etched pits and yields identification from symmetry considerations of the light patterns thereby obtained. The invention includes also a new method for determining crystal lattice orientation.

As the electrical, as well as other properties, of crystals are dependent on the orientation of the external influence with respect to the crystal lattice, the proper orientation of semi-conductor devices is extremely important. Accurate, and sometimes critical control of the properties of a semi-conductor depends on an exact knowledge of the orientation of the monocrystalline base material. Although X-ray diffraction techniques give accurate results, they are unsuitable for use in mass production of semi-conductor devices because they require skilled operators and are time consuming in processing the resultant data.

It has been known that when a crystal surface is etched with certain agents, pits are formed which are bounded by planes parallel to important planes in the crystalline lattice. The formed planes have a smooth mirror like finish and are able to reflect light. Attempts to determine crystal orientation by use of light reflected from such etched surfaces of crystals have heretofore required extended optical equipment. The intensity of reflected light was so low as to be discernible only in an otherwise dark room. Relatively feeble light patterns were obtained. The instrument of the present invention, by employing an optical system which converges the light and by so positioning the optical system with respect to the crystalline surface that the convergent beam comes to a focus after reflection, yields light patterns of sufficient intensity to be viewed in an illuminated room. Moreover, by providing simple means for determining, with respect to a fixed direction, the plane normal to the reflecting surface of the crystal, a rapid determination of the orientation of the crystal lattice is obtained and cutting of the crystal substantially in any desired plane is made possible. The instrument requires but simple optical equipment and does not require highly skilled operators.

For a better understanding of the invention and of a preferred embodiment thereof reference may be had to the accompanying drawing of which:

Fig. 3 is a diagrammatic side view of the instrument; and

Figs. 4a, 4b and 4c are illustrations of typical light patterns obtained from etched monocrystals.

When a crystal, for example germanium, is cut in a plane normal to an approximately known crystallographic direction of the crystal and then the surface lapped and etched with an agent, for example, 1 part hydrofluoric acid, 1 part of a 30% solution of hydrogen peroxide and 4 parts of water, and then washed and dried, pits are etched in its surface and the planes bounding or forming the pits are planes parallel to important planes of the crystal. If the etching is continued for a sufficient length of time, say two minutes, the whole surface of the cut will be closely covered with etch pits.

Figure 1:
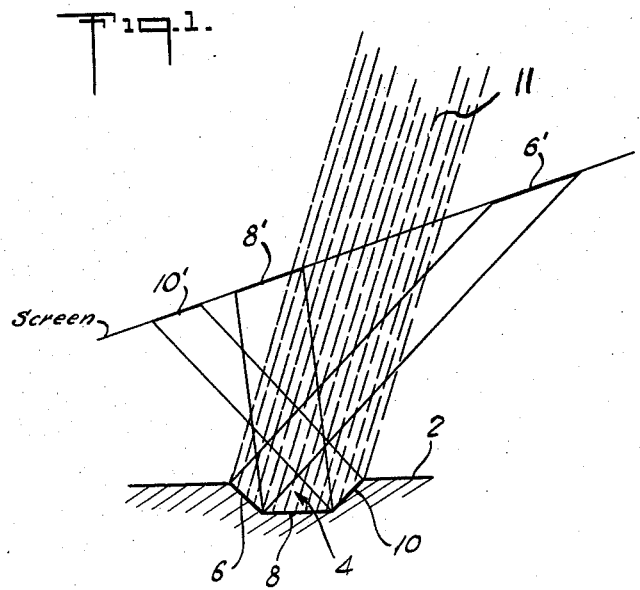
Fig. 1 is a diagram illustrative of the reflection of light from an etch pit.

In Fig. 1 a crystal surface is indicated at 2 with an etched pit 4 therein. The planes indicated at 6, 8 and 10 are planes parallel to natural planes of the crystal and these planes, when a source of light is directed toward the crystal surface along the lines indicated at 11, reflect the light in different directions. A screen placed as indicated in the figure is thus illuminated over three different areas indicated by the reference numerals 6', 8' and 10', being the areas to which light reflected from the planes 6, 8 and 10, respectively, intercept the screen.

Figure 2:
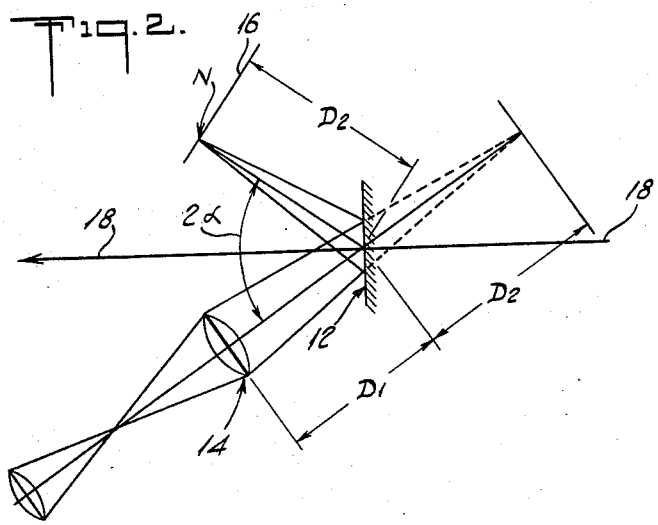
Fig. 2 is a diagram showing the light paths in the new instrument.

When a converging beam of light strikes a mirrored surface the reflected rays continue to converge. In the diagram of Fig. 2 which shows the light paths of the new instrument, a reflecting surface is indicated at 12, a source of convergent light at 14 and a screen at 16. If the focal distance of the convergent beam is equal to $D_1$ plus $D_2$ where $D_1$ is the distance of the source 14 from the reflecting surface 12, then by positioning the screen at a distance $D_2$ from the reflecting surface, as indicated in Fig. 2 the reflected convergent beam will come to a focus on the screen. The angle between the incident main ray and the reflected main ray, indicated as $2\alpha$, is equal to twice the angle of incidence or reflection. Thus the bisector of the angle $2\alpha$, in the plane of the incident and reflected rays, is perpendicular to the reflecting surface 12. In the new instrument of the invention the elements corresponding to the source 14 and the screen 16 are maintained in fixed angular relation and at a constant distance from the crystal surface from which reflection is to be had. The screen is provided with a locating spot, corresponding to the point indicated at N in Fig. 2. The crystal is mounted so that it may be rotated about any one of three mutually perpendicular axes in order that the reflected beam may be made to converge at the point N. When the light so converges at the point N the reflecting surface of the crystal will be perpendicular to a fixed reference line bisecting the angle between the main incident and reflected rays. Such line is indicated in the drawing at 18. In the instrument this reference line is parallel to the base upon which the parts are mounted.

The instrument will now be described with reference to Fig. 3. The instrument comprises an optical bench 20 which includes a base 22 upon which is mounted a level guide 24 carrying two slides 26 and 28 each adjustable longitudinally along the guide. The slide 26 has a vertical stanchion 30 mounted thereon carrying a horizontal arm 32 within which telescopes a rod 34 carrying at its outer end a sleeve 36. Sleeve 36 has a U-shape bracket 38 secured thereon between the arms of which is held a screen 40, the screen being disposed at an angle to the vertical and being provided with an aperture 42 in the lower portion thereof. Attached to the screen and extending therefrom perpendicular to the screen is a rod 44 the purpose of which will become apparent as the description proceeds. Also mounted on the slide 26 is a tubular element 46 within which is the optical system, indicated diagrammatically by the lenses 48, 50 and 52 and diaphragm 54. One end of the tubular element 46 extends through the opening 42 in the screen 40. Within the other end of the tubular element 46 is a source 56 of light energized from a transformer 58. The lens 52 emits a convergent beam of light and the angular disposition of the element 46 and of the screen 40 is such that the bisector of the angle between the rod 44 and the principal ray of the beam issuing from the lens 52 is parallel to the level guide 24. Mounted on the slide 28 is a goniometer indicated generally by the reference numeral 60. The goniometer is provided with means for holding the crystal whose surface has been etched for examination. The goniometer includes conventional means for rotating the crystal holder 62 about the vertical axis and about two mutually perpendicular horizontal axes. The rod 44 is of such length that when the outer end thereof contacts the crystal the parts are positioned, as heretofore described in connection with Fig. 2, to insure that the convergent beam from lens 52 focuses on the screen 40.

Thus when a crystal has been prepared as heretofore described by lapping, etching, washing and drying and has been mounted upon the goniometer, and the goniometer has been moved forward on the guide 24 to bring the rod 44 into contact with the crystal, a pattern of light will appear upon the screen 40. If then the crystal holder is rotated to bring the center of the light pattern coincident with the base of the rod 44, corresponding to the point N of Fig. 2, the reflecting plane of the crystal will be perpendicular to the guide 24 and hence the orientation of such plane may be read from the goniometer scales. From the particular pattern shown on the screen, the crystal plane from which reflection has occurred may be determined. For example, as shown in Fig. 4a, the pattern may be one characteristic of the 100 plane or characteristic of the 111 plane as illustrated in Fig. 4b, or of the 110 plane as illustrated in Fig. 4c.

When the plane at which it is desired to cut a crystal has thus been determined the goniometer may be slid off from the guide 24 and placed in a suitable vise of a cut-off machine in which the saw blade is normal to the base of the goniometer. Crystal slices may then be cut with planes that are normal to the desired crystallographic direction.

The above described instrument may serve in production as a quality control device to determine how accurately a crystal slice prepared as above described or by any other method, is cut normal to a desired crystallographic axis. For this purpose, after lapping or etching of the cut surface a microscopic slide is pressed on to the cut surface of the speciment and the goniometer carrying the crystal slice with the slide thereon is placed in the instrument. Since the slide is transparent the reflected crystal pattern will be surperimposed on the reflection from the surface of the slide. The angle between the normal to the plane of the slice and the given crystallographic direction can be measured by bringing each reflection into coincidence with spot N and noting the difference, if any, of the angular settings of the goniometer. Instead of a microscope slide, a drop of alcohol may be used to provide the second reflecting surface.

From the foregoing description it will be apparent that the invention provides a simple and useful instrument for rapid and accurate determination of crystal orientation. The instrument is suitable for use in production of crystal devices, does not require skilled operators or expensive equipment, is portable and yields accurate results.

The following is claimed:

The method of determining how accurately a crystal is cut normal to a desired crystallographic axis which comprises lapping the cut surface of the crystal, placing a transparent layer over the cut surface of the crystal, placing the cut surface of the crystal with the transparent layer thereon in the path of a convergent light beam to doubly reflect the beam from the outer surface of the layer and from a reflecting plate of the cut surface of the crystal to a screen positioned in the focal plane of the reflecting beams, adjusting the angular orientation of the crystal until the focus of the geam reflected from the crystal is at such location on the screen that the reflecting plane of the crystal yielding the center of the light pattern on the screen is normal to a fixed reference direction, and finally readjusting the angular orientation of the crystal until the focus of the beam reflected from the outer surface of the layer is at the same location on the screen, whereby the difference in the angular settings of the crystal is a measure of the accuracy of cutting of the crystal.

References Cited in the file of this patent

UNITED STATES PATENTS

| | | |
|---|---|---|
| 1,272,156 | Waterloo | July 9, 1918 |
| 1,918,976 | Marrison | July 18, 1933 |
| 2,151,736 | Broughton | Mar. 28, 1939 |
| 2,218,489 | Gerber | Oct. 15, 1940 |
| 2,313,143 | Gerber | Mar. 9, 1943 |
| 2,419,617 | Willard | Apr. 29, 1947 |
| 2,425,750 | McCarty | Aug. 19, 1947 |
| 2,497,070 | Coleman | Feb. 14, 1950 |
| 2,499,788 | Shore | Mar. 7, 1950 |